US011514033B2

(12) United States Patent
Ward et al.

(10) Patent No.: US 11,514,033 B2
(45) Date of Patent: *Nov. 29, 2022

(54) SYSTEM FOR PROVIDING DYNAMIC LINKED PANELS IN USER INTERFACE

(71) Applicant: Palantir Technologies Inc., Denver, CO (US)

(72) Inventors: Lindsay Ward, Santa Clara, CA (US); Derek Cicerone, New York, NY (US); Punyashloka Biswal, Norwalk, CT (US); Sixin Li, Jersey City, NJ (US); Geoff Cameron, New York, NY (US); Adam Storr, Palo Alto, CA (US); Ashwin Ramaswamy, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/119,268

(22) Filed: Dec. 11, 2020

(65) Prior Publication Data

US 2021/0303561 A1 Sep. 30, 2021

Related U.S. Application Data

(63) Continuation of application No. 15/836,654, filed on Dec. 8, 2017, now Pat. No. 10,866,685, which is a
(Continued)

(51) Int. Cl.
*G06F 3/0481* (2022.01)
*G06F 40/14* (2020.01)
(Continued)

(52) U.S. Cl.
CPC ........ *G06F 16/2425* (2019.01); *G06F 3/0481* (2013.01); *G06F 16/24575* (2019.01);
(Continued)

(58) Field of Classification Search
CPC ............... G06F 16/2425; G06F 3/0481; G06F 16/24575; G06F 40/14; G06F 40/151; G06F 40/186; G09G 5/14; G09G 2354/00
See application file for complete search history.

(56) References Cited

U.S. PATENT DOCUMENTS 7,194,680 B1 * 3/2007 Roy ...................... G06F 40/174
715/205
9,454,281 B2 9/2016 Ward et al.
(Continued)

OTHER PUBLICATIONS

U.S. Pat. No. 9,454,281, System for Providing Dynamic Linked Panels in User Interface, issued Sep. 27, 2016.
(Continued)

*Primary Examiner* — Cao H Nguyen
(74) *Attorney, Agent, or Firm* — Knobbe, Martens, Olson & Bear, LLP

(57) ABSTRACT

A computer system may be configured to: execute a first query associated with a first panel; display the first panel in a user interface based on first display settings of the first panel, the first panel displaying at least a portion of the result of the first query, the result of the first query associated with a variable; execute a second query associated with a second panel, wherein the second query refers to the variable associated with the first query; display the second panel in the user interface based on second display settings of the second panel, the second panel displaying at least a portion of the result of the second query; and in response to user input changing the displayed result in the first panel: re-execute the second query; and update the display of the second panel in the user interface based on results of the re-executed second query.

16 Claims, 14 Drawing Sheets

Related U.S. Application Data continuation of application No. 15/252,021, filed on Aug. 30, 2016, now Pat. No. 9,880,696, which is a continuation of application No. 14/841,338, filed on Aug. 31, 2015, now Pat. No. 9,454,281.

(60) Provisional application No. 62/135,448, filed on Mar. 19, 2015, provisional application No. 62/045,488, filed on Sep. 3, 2014.

(51) Int. Cl.
   *G06F 40/151* (2020.01)
   *G06F 40/186* (2020.01)
   *G06F 16/242* (2019.01)
   *G09G 5/14* (2006.01)
   *G06F 16/2457* (2019.01)

(52) U.S. Cl.
   CPC ............ *G06F 40/14* (2020.01); *G06F 40/151* (2020.01); *G06F 40/186* (2020.01); *G09G 5/14* (2013.01); *G09G 2354/00* (2013.01)

(56) References Cited

U.S. PATENT DOCUMENTS

| | | | |
|---|---|---|---|
| 9,880,696 B2 | 1/2018 | Ward et al. | |
| 10,866,685 B2 | 12/2020 | Ward et al. | |
| 2005/0039119 A1* | 2/2005 | Parks | G06F 40/103 715/209 |
| 2014/0033083 A1* | 1/2014 | Nack | G06F 8/38 715/763 |
| 2015/0212663 A1* | 7/2015 | Papale | G06F 16/248 715/762 |
| 2016/0012551 A1* | 1/2016 | Eckerd | G06F 40/186 705/14.45 |

OTHER PUBLICATIONS

U.S. Pat. No. 9,880,696, System for Providing Dynamic Linked Panels in User Interface, issued Jan. 30, 2018.
U.S. Pat. No. 10,866,685, System for Providing Dynamic Linked Panels in User Interface, issued Dec. 15, 2020.
Official Communication for European Patent Application No. 19163911.1 dated Dec. 14, 2020, 10 pages.
Official Communication for European Patent Application No. 19163911.1 dated Feb. 11, 2022, 12 pages.
Antunes et al., "Defending against Web Application Vulnerabilities", Computer, Jan. 1, 2012, pp. 66-72.
"Directory Traversal Attack", Wikipedia.org, May 31, 2015, https://en.wikipedia.org/w/index.php?title=Directory_traversal_attack&oldid=664794964, 5 pages.
"JSON", Wikipedia.org, Aug. 30, 2015, https://en.wikipedia.org/w/index.php?title=JSON&oldid=678615888, 8 pages.
Official Communication for European Patent Application No. 19163911.1 dated Jul. 20, 2022, 15 pages.
Official Communication for European Patent Application No. 19163911.1 dated Aug. 9, 2022, 16 pages.

\* cited by examiner

QUERIES query 1
query 2
query 3
...

⊕ Add New Query

--- query 3

REQUEST ⚙

SOURCE  source 1  ▾  ↻ RUN REQUEST

```
1  {{#each w1.selectedValues}}
2  {{#if w7.selectedRowKeys}}
3  UPDATE "slateSuperBowlSquares" SET "owner" = '',
   "available" = true WHERE "squareID" LIKE {{param
   this}};
4  INSERT INTO "slateSuperBowlSquaresChanges" VALUES
5     ({{param this}}, {{param user.username}}, '',
   NOW());
6  {{else}}
7  UPDATE "slateSuperBowlSquares" SET "owner" = {{param
   w3.selectedValue}}, "available" = false WHERE
   "squareID" LIKE {{param this}};
8  INSERT INTO "slateSuperBowlSquaresChanges" VALUES
9     ({{param this}}, {{param user.username}},
   {{param w3.selectedValue}}, NOW());
10 {{/if}}
11 {{/each}}
```

PREVIEW

1

[ CANCEL ]  [ ⊗ DELETE ]  [ UPDATE QUERY ]

FIG. 2B

Document 1

Queries | Global Variables | Document CSS

COMPANY STOCK PRICE  100% ▼

$125,000

YOUR EQUITY VALUE:

COMPANY VALUATION: $9 BILLION  — 230

| GLOBAL VARIABLES | | ✕ |
|---|---|---|
| NAME | DEFAULT VALUE | |
| options | 100000 | ✕ |
| strike | 4.75 | ✕ |

COMPANY A
$23 BILLION

COMPANY D
$370 BILLION

PANELS
p1
p2
p3 ...

FIG. 2C

Document 1

Queries | Global Variables | Document CSS

PANELS
p1
p2
p3
...

COMPANY STOCK PRICE $1

YOUR EQUITY VALUE:

$9

COMPANY VALUATION:

| COMPANY A | COMPANY B |
|---|---|
| $23 BILLION | $65 BILLION |

$210

100% ▼

DOCUMENT CSS — □ ×
```
1  si-markdown {
2    height: 100%;
3  }
4
5  #w2, #w5, #w7, #w8, #w11 {
6    text-align: center;
7  }
8
9  #w5 div, #w7 div, #w8 div, #w11 div {
10   height: 100%;
11   background: #87E587;
12   padding-top: 22px;
13 }
14
15 #w1 .irs-line {
16   background: #87E587;
17 }
```
— 240

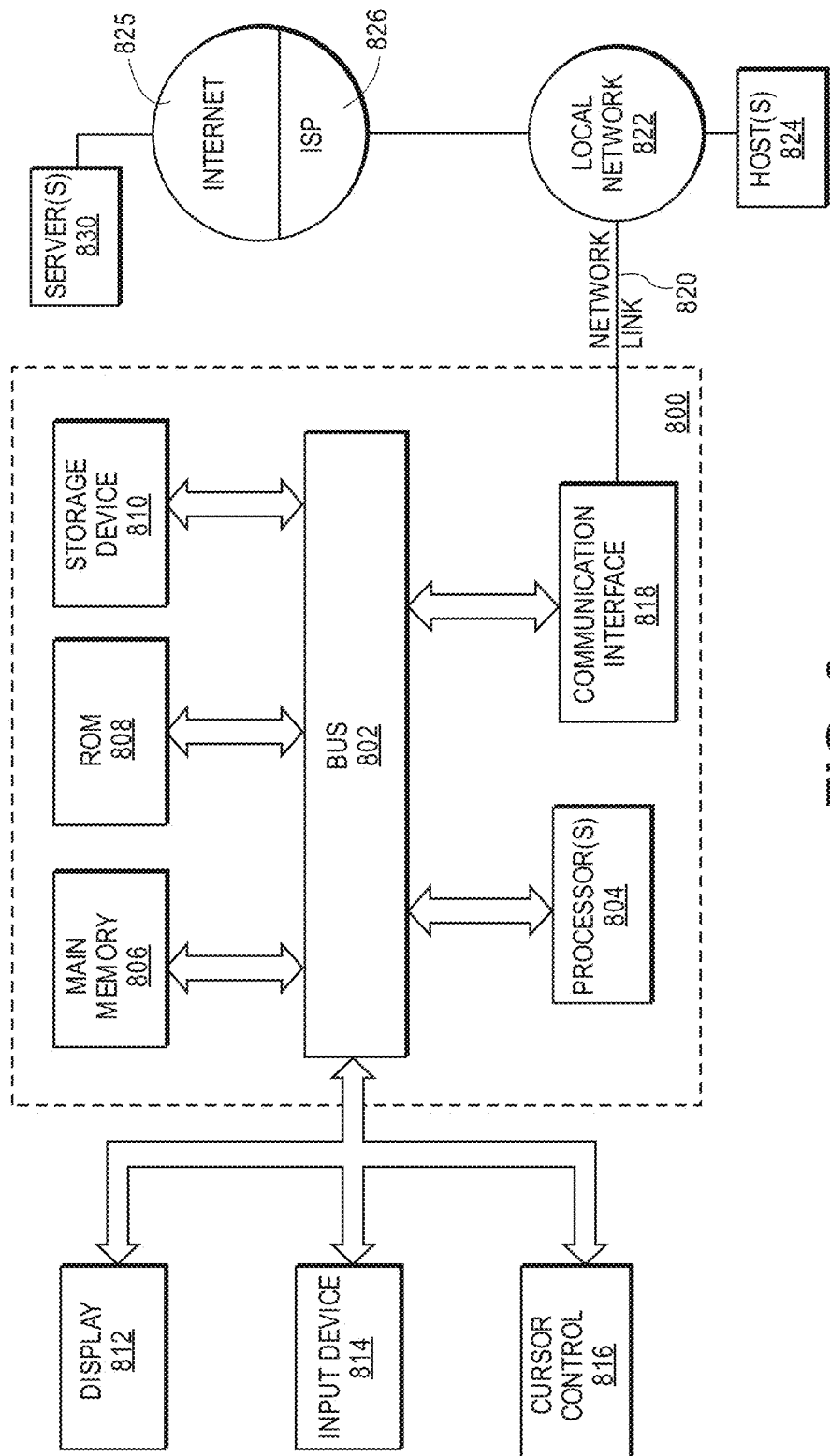

SYSTEM FOR PROVIDING DYNAMIC LINKED PANELS IN USER INTERFACE

INCORPORATION BY REFERENCE TO ANY PRIORITY APPLICATIONS

This application is a continuation of U.S. patent application Ser. No. 15/836,654, filed Dec. 8, 2017, which is a continuation of U.S. patent application Ser. No. 15/252,021, filed Aug. 30, 2016 (now U.S. Pat. No. 9,880,696, issued Jan. 30, 2018), which is a continuation of U.S. patent application Ser. No. 14/841,338, filed Aug. 31, 2015 (now U.S. Pat. No. 9,454,281, issued on Sep. 27, 2016), which claims the benefit of U.S. Provisional Application No. 62/045,488, filed Sep. 3, 2014 and U.S. Provisional Application No. 62/135,448, filed Mar. 19, 2015, each of which is incorporated herein by reference in its entirety. Any and all applications, if any, for which a foreign or domestic priority claim is identified in the Application Data Sheet of the present application are hereby incorporated by reference under 37 CFR 1.57.

TECHNICAL FIELD

The present disclosure relates to systems and techniques for data integration, analysis, and visualization. More specifically, the present disclosure relates to dynamic linked panels associated with queries performed on data sources and visualization of results of the queries.

BACKGROUND

Organizations and/or companies are producing increasingly large amounts of data. Such data may be queried and presented in a user interface.

SUMMARY

The systems, methods, and devices described herein each have several aspects, no single one of which is solely responsible for its desirable attributes. Without limiting the scope of this disclosure, several non-limiting features will now be discussed briefly.

In one embodiment, a computer system configured to display data from one or more data sources comprises: one or more hardware computer processors configured to execute code in order to cause the system to: generate a user interface configured to display a plurality of panels including a first panel and a second panel, each of the plurality of panels having respective display settings and queries including code for querying one more data sources; execute a first query associated with the first panel; display the first panel in the user interface based on first display settings of the first panel, the first panel displaying at least a portion of the result of the first query, the result of the first query being associated with a variable; execute a second query associated with the second panel, wherein the second query refers to the variable associated with the first query of the first panel; display the second panel in the user interface based on second display settings of the second panel, the second panel displaying at least a portion of the result of the second query; and in response to user input changing the displayed result in the first panel: re-execute the second query associated with the second panel; and update the display of the second panel in the user interface based on results of the re-executed second query of the second panel.

According to certain aspects, the code can be further configured to: receive a third query from the first panel for writing data to the one or more data sources; process one or more parameters in the third query by invoking a function; and perform the third query with the processed one or more parameters to write data to the one or more data sources. The processing of the one or more parameters in the third query may be performed at least in part by: replacing the one or more parameters with respective placeholders; and storing respective values corresponding to the one or more parameters in an array. The processing of the one or more parameters in the third query may be performed at least in part by changing respective values corresponding to the one or more parameters to string format. Each of the plurality of panels can be referenced as a template that is rendered by a template engine, and the function can be registered with the template engine. The code may be further configured to: prior to running the query of the first panel, invoke one or more functions to determine whether a table, a row, or a column referenced in the query exists in the one or more data sources.

In another embodiment, a method of displaying data from one or more data sources comprises: using one or more hardware computer processors: generating a user interface configured to display a plurality of panels including a first panel and a second panel, each of the plurality of panels having respective display settings and queries including code for querying one more data sources; executing a first query associated with the first panel; displaying the first panel in the user interface based on first display settings of the first panel, the first panel displaying at least a portion of the result of the first query, the result of the first query being associated with a variable; executing a second query associated with the second panel, wherein the second query refers to the variable associated with the first query of the first panel; displaying the second panel in the user interface based on second display settings of the second panel, the second panel displaying at least a portion of the result of the second query; and in response to user input changing the displayed result in the first panel: re-executing the second query associated with the second panel; and updating the display of the second panel in the user interface based on results of the re-executed second query of the second panel.

According to certain aspects, the method may further comprise: receiving a third query from the first panel for writing data to the one or more data sources; processing one or more parameters in the third query by invoking a function; and performing the third query with the processed one or more parameters to write data to the one or more data sources. Said processing the one or more parameters in the third query can comprise: replacing the one or more parameters with respective placeholders; and storing respective values corresponding to the one or more parameters in an array. Said processing the one or more parameters in the third query can comprise changing respective values corresponding to the one or more parameters to string format. Each of the plurality of panels may be referenced as a template that is rendered by a template engine, and the function may be registered with the template engine. The method may further comprise: prior to running the query of the first panel, invoking one or more functions to determine whether a table, a row, or a column referenced in the query exists in the one or more data sources.

In some embodiments, a non-transitory compute readable medium comprises instructions for displaying data from one or more data sources that cause a computer processor to: generate a user interface configured to display a plurality of panels including a first panel and a second panel, each of the plurality of panels having respective display settings and queries including code for querying one more data sources; execute a first query associated with the first panel; display the first panel in the user interface based on first display settings of the first panel, the first panel displaying at least a portion of the result of the first query, the result of the first query being associated with a variable; execute a second query associated with the second panel, wherein the second query refers to the variable associated with the first query of the first panel; display the second panel in the user interface based on second display settings of the second panel, the second panel displaying at least a portion of the result of the second query; and in response to user input changing the displayed result in the first panel: re-execute the second query associated with the second panel; and update the display of the second panel in the user interface based on results of the re-executed second query of the second panel.

According to certain aspects, the instructions can be further configured to cause the computer processor to: receive a third query from the first panel for writing data to the one or more data sources; process one or more parameters in the third query by invoking a function; and perform the third query with the processed one or more parameters to write data to the one or more data sources. The processing of the one or more parameters in the third query may be performed at least in part by: replacing the one or more parameters with respective placeholders; and storing respective values corresponding to the one or more parameters in an array. The processing of the one or more parameters in the third query may be performed at least in part by changing respective values corresponding to the one or more parameters to string format. Each of the plurality of panels can be referenced as a template that is rendered by a template engine, and the function can be registered with the template engine. The instructions may be further configured to cause the computer processor to: prior to running the query of the first panel, invoke one or more functions to determine whether a table, a row, or a column referenced in the query exists in the one or more data sources.

BRIEF DESCRIPTION OF THE DRAWINGS

FIGS. 2A-2D illustrate one embodiment of a user interface of a dashboard creation system for creating a dynamic panel.

FIG. 8 illustrates a computer system with which certain methods discussed herein may be implemented.

DETAILED DESCRIPTION

Disclosed herein are various systems and methods for providing a plurality of dynamic panels in a user interface (UI). The dynamic panels (or "panels") can display different pieces of data from one or more data sources. For example, a query can be run on one or more data sources, and different parts of the result from the query can be output using different dynamic panels. For instance, each dynamic panel can be associated with a variable to output. Different types of dynamic panels can be provided, such as charts (e.g., line chart, bar chart, etc.), controls (e.g., dropdown, multiselect box, search box, etc.), maps, tables, text boxes, etc. The panels can be data source agnostic. For example, the panels can be associated with data from different types of data sources, such as relational databases (e.g., SQL Server), Elasticsearch, etc. In some embodiments, individual panels may each be referred to as "widgets." In some embodiments, the user interface including multiple panels may be referred to as a "dashboard."

Figure 1:
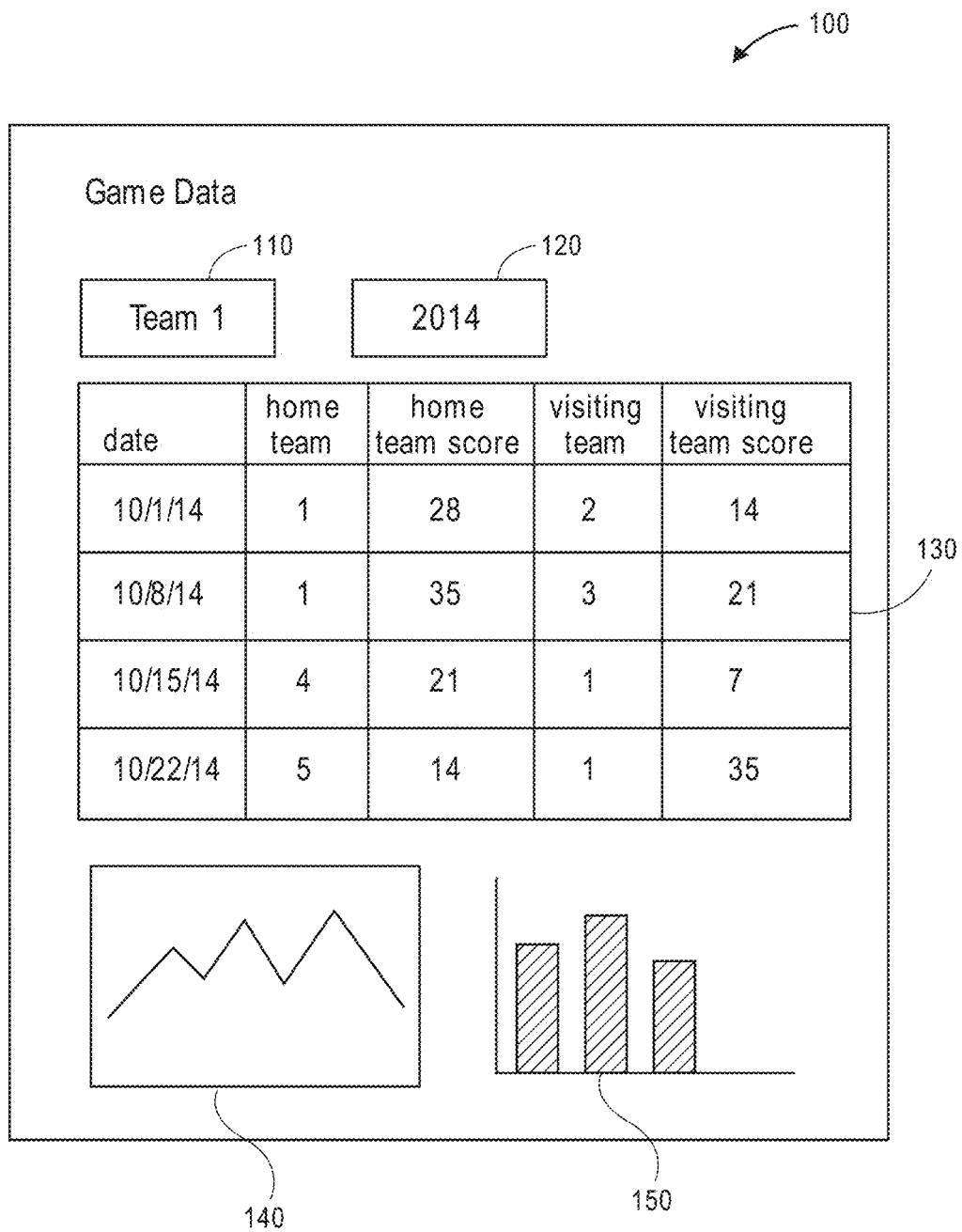
FIG. 1 illustrates one embodiment of a user interface comprising dynamic panels for displaying results of queries performed on one or more data sources.
Figure 7A:
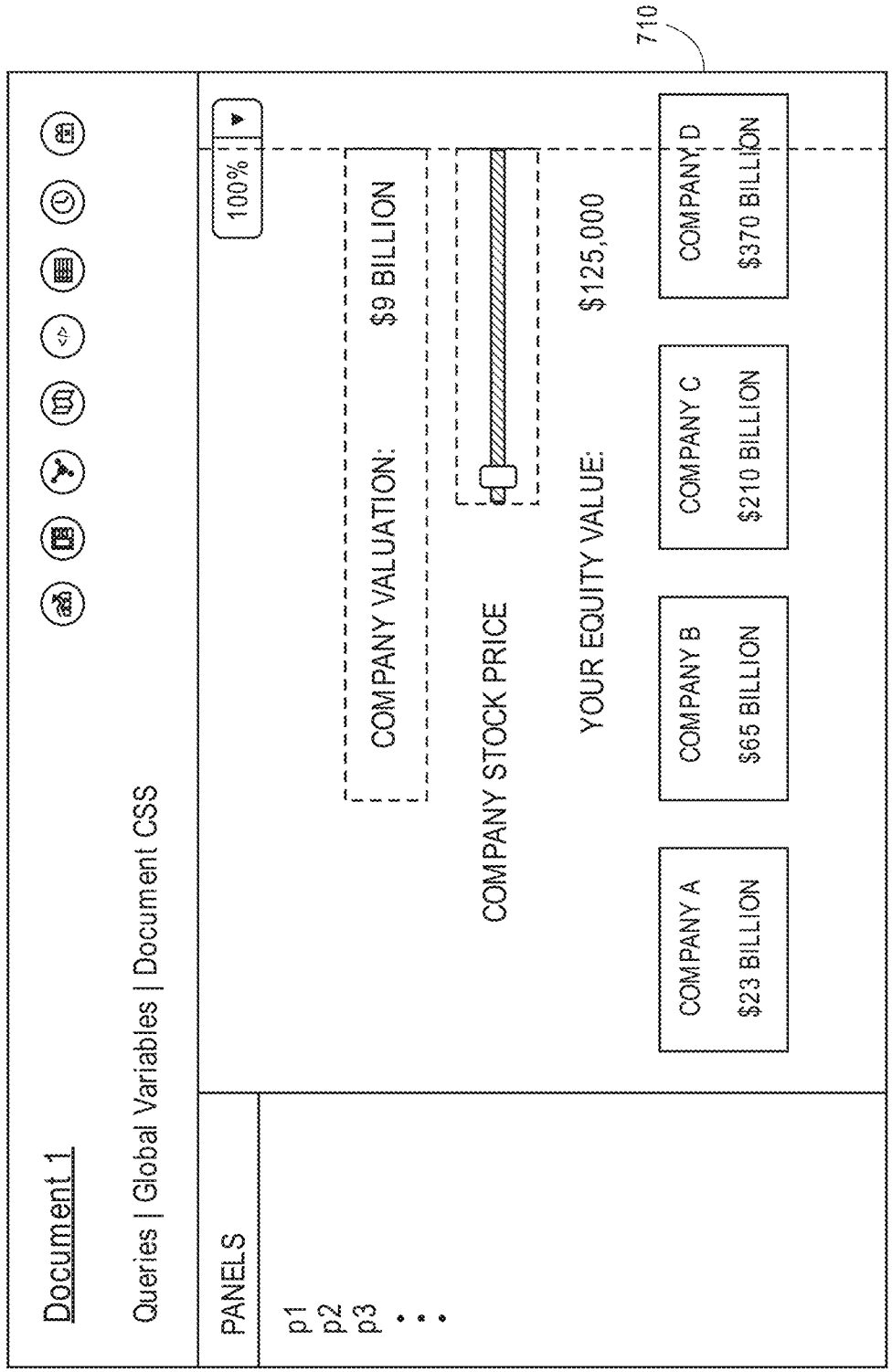
FIGS. 7A-7C illustrate various examples of panels and features provided by a dashboard creation system, according to certain embodiments.
Figure 7B:
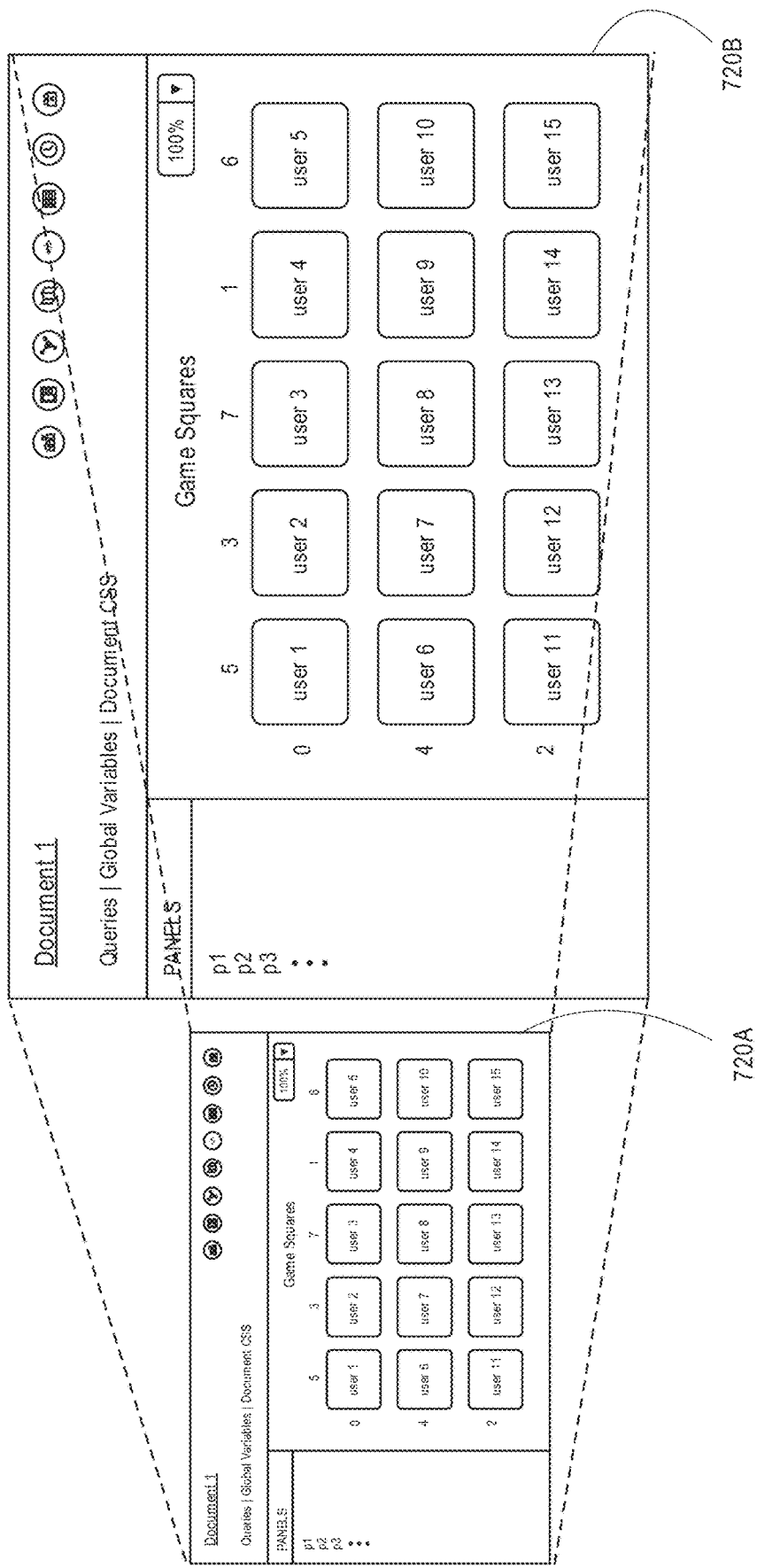
Figure 7C:
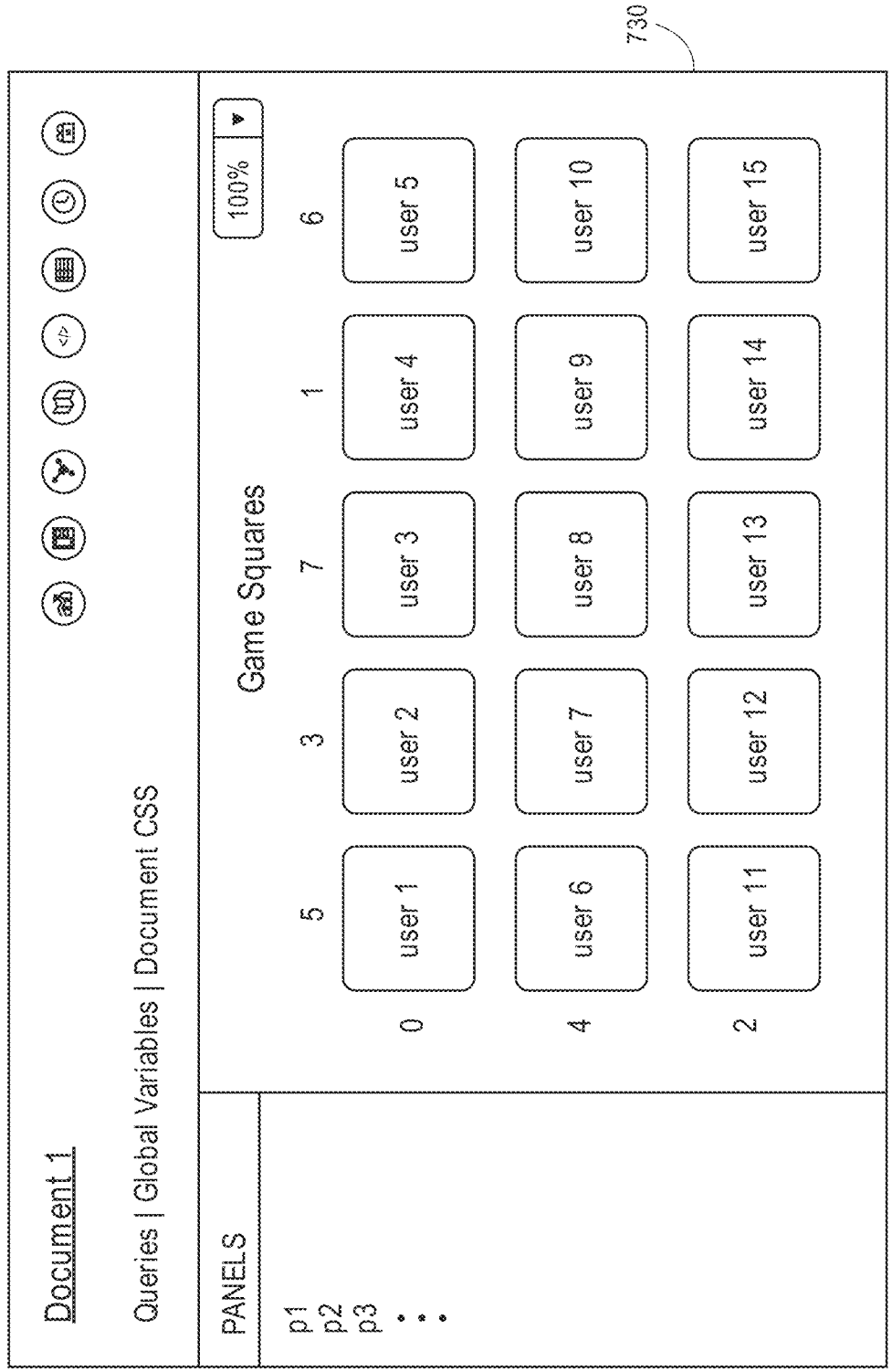

FIG. 1 illustrates one embodiment of a user interface 100 comprising dynamic panels for displaying results of queries performed on one or more data sources. Panels 110 through 150 are some examples of different types of panels that can be included in the user interface 100. Panel 110 and panel 120 are dropdown control panels; panel 130 is a table panel; panel 140 is a line chart panel; and panel 150 is a bar chart panel. Many different types of panels can be included in the user interface 100, depending on the embodiment. For instance, as explained above, types of panels can include charts, controls, graphs, maps, etc. Examples of chart panels may include a bar chart, line chart, pie chart, scatter plot, etc. Examples of control panels may include a date picker, dropdown control, button (e.g., export button, query button, etc.), input box, multiselect box, slider, text area, timeline, etc. Other examples of panels may include a card, image, link (e.g., hyperlink), list, text, graphs, maps, etc. FIGS. 7A-7C illustrate additional examples of types of panels.

A dynamic panel can be linked to one or more other dynamic panels. As mentioned above, the output of a panel can be used in another panel. When the data of a panel depends or relies on the data of another panel, if the data in the source panel changes, the data in the panel that relies on the source panel may also change or be refreshed. For example, in FIG. 1, an example query obtains data regarding National Football League teams from multiple data sources. Panel 110 can be a dropdown control that selects the team to view. Panel 120 can be a dropdown control that selects the season for which to display the games. Panel 130 can be a table that displays the games for the team selected in panel 110 for the season selected in panel 120. Changes to the selected team in panel 110 or the selected season in panel 120 can update the games displayed in panel 130. In some embodiments, panel 140 and panel 150 display statistics related to the games displayed in panel 130; when games displayed in panel 130 change, panel 140 and panel 150 update accordingly.

The query and the settings relating to the display of particular panels can be managed separately. For example, a user interface can provide a section for entering the query and another section for entering display related settings. Separate management of the query and the display settings can allow the panels to be easily updated within the user interface and allow reuse of queries. The page that contains the panels may be referred to as a "document."

In this manner, multiple panels can be used to display different aspects of the result from a query. One query can be run to obtain the needed information, and the result can be parsed and displayed using multiple panels. Display of information can be simplified by using multiple panels. Also, the query can be reused across panels since each panel can extract a portion of the result to display. In certain embodiments, each panel may have its own query and display the result of the query. The panels can also be linked together so that the data from one panel can be used to display the data in another panel.

Exemplary User Interface of Dashboard Creation System

Figure 2A:
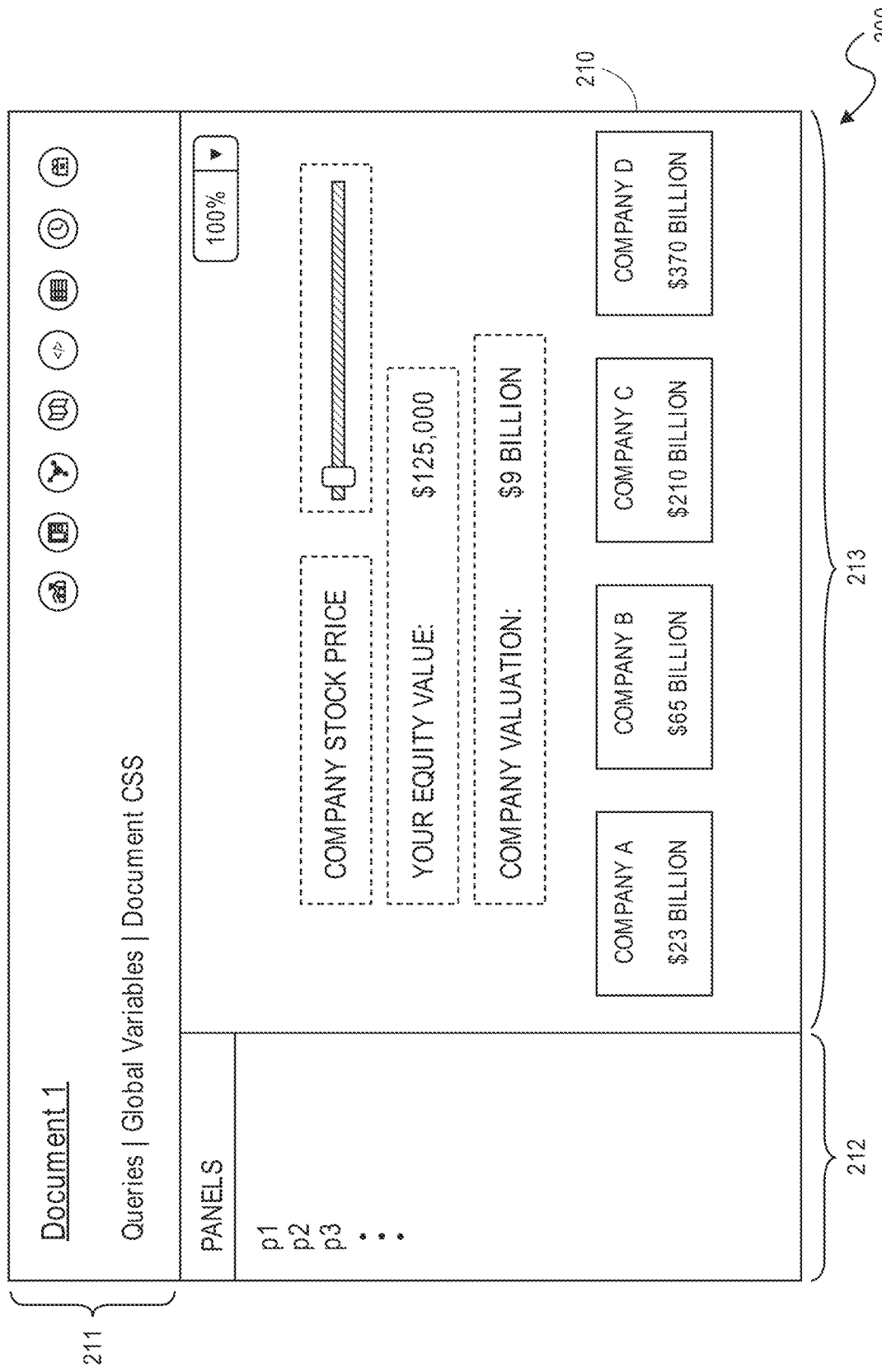

FIGS. 2A-2D illustrate one embodiment of a user interface 200 of a dashboard creation system for creating one or more dynamic panels for use in a dashboard. For example, the user interface 200 can provide functionalities for custom styling, query editing and/or previewing, defining query sub-properties, etc. of panels. FIG. 2A illustrates one embodiment of the main page 210 of the user interface 200. FIG. 2B illustrates one embodiment of the query page 220. FIG. 2C illustrates one embodiment of the global variables page 230. FIG. 2D illustrates one embodiment of the document Cascading Style Sheets (CSS) page 240.

Using the main page 210, the user can create, edit, delete, and manage one or more panels. In one embodiment, the main page 210 includes a top section 211 that displays the name of the document selected, if any; links to the query page 220 (FIG. 2B), the global variables page 230 (FIG. 2C), and the document CSS page 240 (FIG. 2D); and various icons for creating panels and for other features. The main page 210 also includes a panels section 212 that displays the list of panels included in the document. The main page 210 includes a design section 213 where the user can create, organize, and edit panels. In the example of FIG. 2A, the user creates Document 1, which contains panels p1, p2, p3, etc. A panel can be referred to by its name, and the name of the panel can be displayed when the cursor is over a particular panel. For illustrative purposes, certain items in design section 213 are marked with dashed lines to indicate that they are panels; for example, the slider in the top right corner of design section 213 is a panel. Four blocks at the bottom of design section 213 (listing company name and dollar value) are also examples of panels; these panels are shown in solid lines because they have borders.

Moving to FIG. 2B, the query page 220 allows the user to enter a query. For example, a query can be associated with a panel. The example query page 220 may appear when the user clicks on the link to the query page 220 on the main page 210 (FIG. 2A). The query page 220 can display a list of queries 221, for example, stored queries in a database (e.g., template storage 355, 455 in FIGS. 3 and 4). In some embodiments, a query may be reused in other documents. For example, the user can select a query from the list of queries or create a new query. In the example of FIG. 2B, the query page includes a button for adding a new query. The query page 220 can include a code section 222 for entering the query and a preview section 223 for previewing results of execution of the query in code section 222. The user may update or delete a query from the query page 220. The example query in FIG. 2B relates to the panel shown in FIG. 7C and updates the data source(s) to reflect availability of individual squares or cards and to add information relating to the squares or cards (e.g., insert username, time, etc.).

FIG. 2C illustrates the global variables page 230, which allows the user to define global variables associated with a document and/or a panel. The global variables can be referred to by the panels in the document. In addition, the user may also define variables associated with a panel. The variables can be used to link two or more panels together. For instance, the query for a panel may reference a variable in one or more other panels. The panels may be linked in the sense that when the data in a particular linked panel updates, the data in the panels that reference the particular panel also updates. The global variables page 230 can appear when the user clicks on the link to the global variables page 230 on the main page 210 (FIG. 2A). The global variables page 230 can be a pop-up window as illustrated in FIG. 2C or a separate page, for example, like the query page 220. In the example of FIG. 2C, the global variables page 230 shows two variables "options" and "strike." In some embodiments, a global variable is defined for a panel. The panel global variable may be referenced using the format "<panel name>.<global variable name>." For example, if "options" variable is associated with panel p1, and the user can refer to "options" variable as "p1.options." The panel global variables may also be used to link two or more panels together. In some embodiments, global variables may be used to link two or more panels. In one embodiment, global variables may be referred to in a uniform resource locator (URL). The global variables may be modified by changing the values associated with the global variables in the URL.

FIG. 2D illustrates the document CSS page 240 that allows the user to define the style for a document and the panels in the document. The document CSS page 240 can appear when the user clicks on the link to the document CSS page 240 on the main page 210 (FIG. 2A). The document CSS page 240 can be a pop-up window as illustrated in FIG. 2D or a separate page, for example, like the query page 220. Different styles can be applied at various levels of granularity; for example, a style can apply to individual elements within the document or the panel. The document CSS page 240 may also specify the dimensions of the document and the panels in the document. The same CSS may be applied to various panels by referring to a panel's number, title, or type (e.g., dropdown, text, etc.).

In some embodiments, the user interface 200, including the various pages illustrated in FIGS. 2A-2D, can be a web interface. The system may also provide different types or modes of user interfaces for authoring and editing documents and panels. For example, more advanced users can use an interface for directly entering the query, and beginner users can use a simpler interface that allows selection of values for various aspects of a panel (e.g., x value and y value of a chart). Users can share documents with other users and can give other users permission to edit, read only, etc. For example, the system can provide an edit mode (or "author mode"), in which the user can edit all aspects of a panel, e.g., the query for the panel, the display settings for the panel, etc. The system can also provide a read only mode (or "consumer mode"), in which the user can interact with the panels (e.g., select a value for a dropdown control), but may not edit other aspects of panels. In certain embodiments, users can edit panels within a web authoring environment. For example, users may use web technologies to edit the panels and may edit the panels within a web page or web interface.

In one embodiment, the user interface 200 can have two viewing modes: a WYSIWYG (What You See Is What You Get) editor mode and a corresponding read-only consumer mode. In editor mode, built-in panels like bar charts, scatter plots, time series plots, tables, dropdown menus, text boxes, etc. can be added and arranged on the canvas or page. The user can author and edit data queries via a rich editor UI, which can support quickly previewing results for quick debugging. Queries may natively support templating (e.g., via Handlebars) to link to panels, URL parameters, or data from other queries. Panels can also be templatized to link to data from the queries and coordinate with other panels. Additionally, the editor can customize styling for a particular page or document, or deployment. The read-only consumer mode may allow finished web pages to be shared to a set of users that can interact with a page but not edit its layout or setup.

Querying and Displaying Data in Data Sources Using Dynamic Panels

Figure 3:
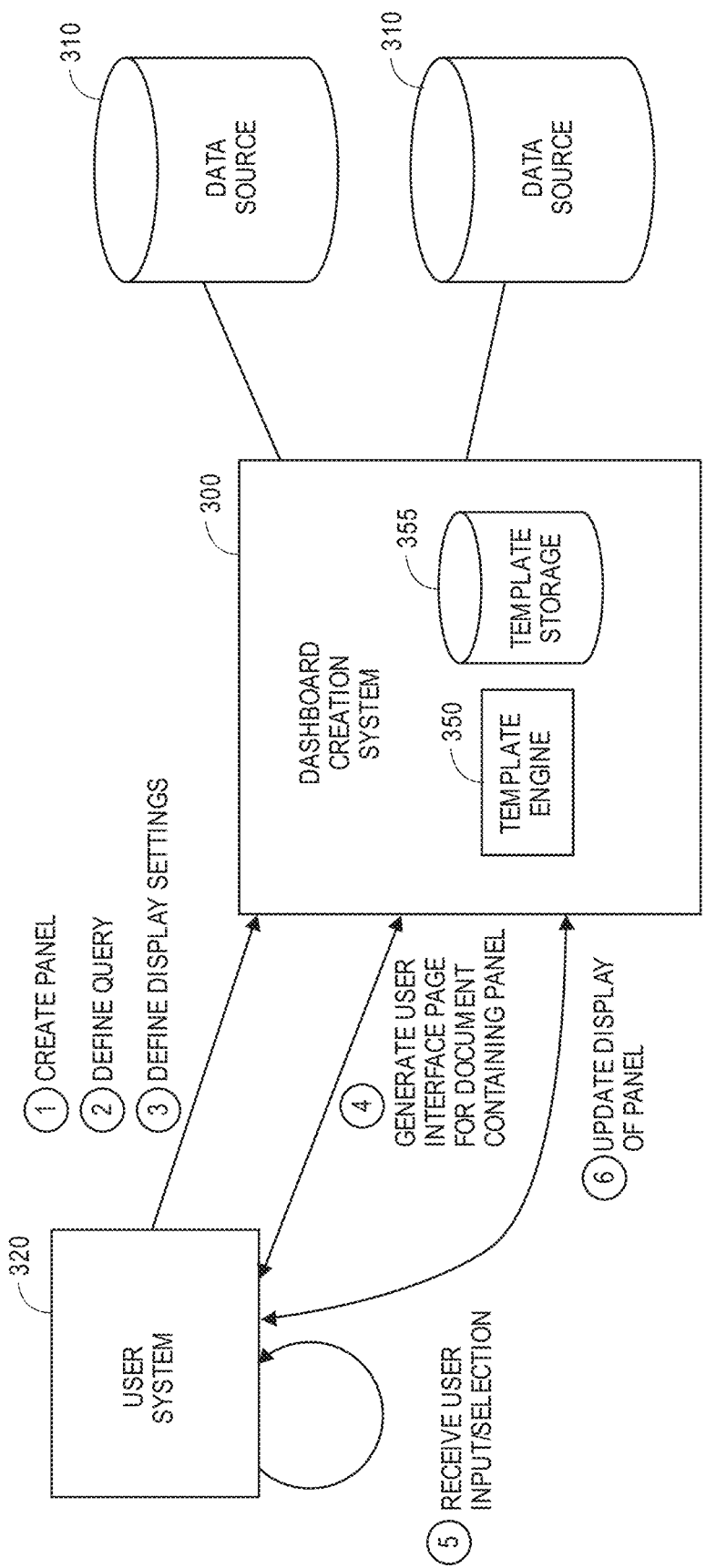
FIG. 3 is a data flow diagram illustrative of the interaction between the various components of a dashboard creation system configured to create and display dynamic panels, according to one embodiment.

FIG. 3 is a data flow diagram illustrative of the interaction between the various components of a dashboard creation system 300 configured to create and display dynamic panels, according to one embodiment. The system 300 can be connected to one or more data sources 310, such as databases. The system 300 may include a template engine 350 and template storage 355. A template system may allow creation of templates that can be used to generate user interface pages, such as web pages. A template system can combine templates and data from data sources to generate user interface pages. For example, a template engine or processor of the template system can render the templates and data from data sources into finished pages. The template engine 350 can render user interface pages based on the documents and/or data in data sources 310. In some embodiments, a template is any text that contains a template placeholder(s) (e.g., double curly brackets: "{{" and "}}"), and the template engine 350 processes the template text with a template context (e.g., an object) and renders the template text to provide the final output. The output can be incorporated into query backends or be used to drive other panels. The template storage 355 can store templates and related information. In certain embodiments, the template storage 355 can also store documents, panels included in documents, and related information. Some examples of template systems may include Handlebars, Mustache, etc. FIG. 3 shows the template engine 350 and the template storage 355 as a part of the system 300, but they may reside in a separate computing system or on separate computing devices from the system 300. For example, the template engine 350 can be external to the system 300. The system 300 may communicate with a user system 320, such as a desktop computer, laptop, mobile phone, tablet, mobile devices, etc. For example, the user system 320 displays user interface pages rendered by the template engine 350. The system 300 may include additional or different components, depending on the embodiment.

At data flow action 1, the user creates a panel. As explained above, a panel can have a query associated with it and display settings associated with it.

At data flow action 2, the user defines a query associated with the panel. As mentioned above, the panels can be data source agnostic and can be associated with data from different types of data sources, such as relational databases SQL, Elasticsearch, etc. The system 300 can connect to and query data from any data source that supports a text-based query language. The system 300 can support different types of query languages and/or tools, depending on the embodiment. In certain embodiments, Handlebars can be used for the queries. In some embodiments, JSON (JavaScript Object Notation) can be used for the queries. In other embodiments, the system 300 can include one adapter for SQL databases and another adapter for REST backends (e.g., Elasticsearch), which may be provided as default adapters. The system 300 can additionally allow the user to transform and selectively extract data out of query results. For example, the user can extract data from JSON query responses using JSONPath.

At data flow action 3, the user defines display settings associated with the panel. The user can define the display settings in the document CSS for the panel. The user can create additional panels and define the query and display settings for each panel. One or more panels may be added to a container. A container may function as a holder for panels. A container can act as a collection of panels that move as a unit. The user can define the layout of the panels within the container, and also define behavior for the container, which can apply to all the panels in the container as a group. The user may add tabs for a container. For example, a container may include multiple tabs, and the user can switch between tabs to view different content. Each tab can act as a separate content space and hold different panels.

At data flow action 4, the system 300 generates the user interface page for the document that contains the panel. When the system 300 receives a request from the user system 320 for a particular document, the system 300 can obtain the requested document, for example, from the template storage 350 and run the query associated with the panels in the documents. The template engine 350 may combine the document, the panels, and the query results in order to generate finished user interface pages. As explained above, one query can be used to obtain data, and different parts of the query can be associated with different panels. For instance, a query q returns columns $c1$, $c2$, $c3$, and $c4$, and the system 300 creates a text panel whose text is {{q.c1}}, a dropdown panel whose values is {{q.c2}}, and a chart panel whose x values and y values are {{q.c3}} and {{q.c4}}, respectively. Or each panel may have a query associated with it and the result of the query can be associated with the particular panel. The finished user interface pages can be then sent to the user system 320 to be displayed in a user interface.

At data flow action 5, the user system 320 receives user input/selection in the user interface. The user may change the displayed result in the user interface of the user system 320. For example, the user may select a particular value in a dropdown control. Or the user may select a particular panel or an item within a panel. The user input or selection is sent to the system 300.

At data flow action 6, the system 300 updates the display of the panel. For instance, the query may be rerun or the query result may be filtered based on the selected value in a dropdown control. Or actions may be associated with a panel or an item within a panel, and such actions may be performed. For example, selection of a panel or an item within a panel can display options or attributes related to the panel or the item. In one example, the selection of a table row in one panel is linked to another panel that contains more detailed information about the selected row. A table shows a list of games as in FIG. 1, and selecting a game in the table shows more detailed statistics on the selected game in a different panel. Certain details relating to FIG. 3 are further explained below in connection with FIG. 3A.

The system 300 can be highly extensible, and panels can be easily created, edited, and/or removed. In one embodiment, a new panel can be added by creating a web module (e.g., an AngularJS module). A simple web module may be easily created by a suitable module generator (e.g., via Yeoman generator). Similarly, data adapters for new types of data sources can be easily added (e.g., via a java jar).

Linking of Dynamic Panels

Figure 3A:
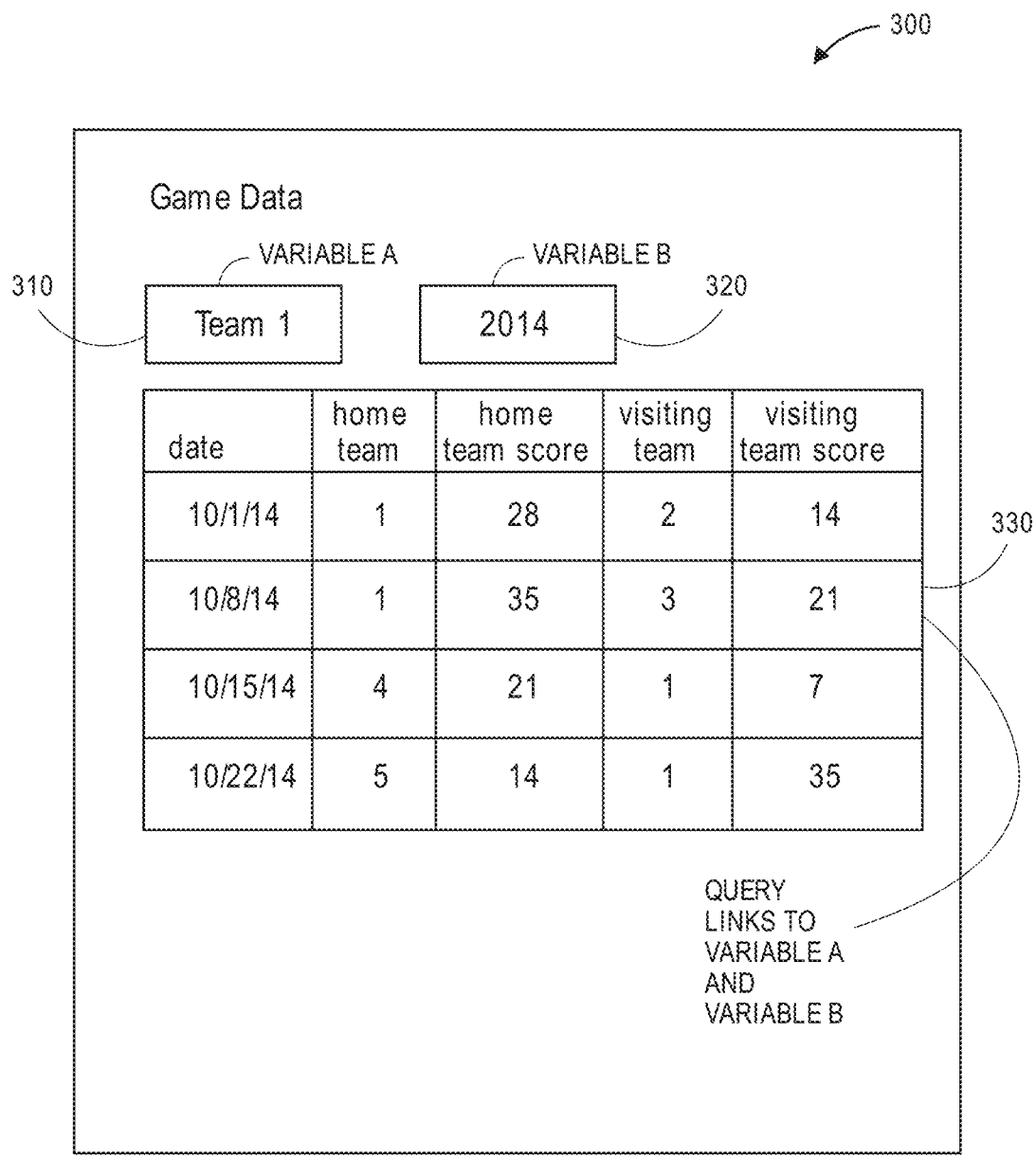
FIG. 3A illustrates one example of linking multiple dynamic panels.

FIG. 3A illustrates one example of linking multiple dynamic panels. In the example of FIG. 3, panels 310, 320, and 330 are similar to panels 110, 120, and 130 in FIG. 1. Panels 310, 320, and 330 may be named p1, p2, and p3, respectively. As mentioned in connection with FIG. 1, panel 310 can be a dropdown control that selects the team to view; panel 320 can be a dropdown control that selects the season for which to display the games; and panel 330 can be a table that displays the games for the team selected in panel 310 for the season selected in panel 320. For example, panels 310 and 320 can have a selected value variable associated with them since they are dropdown controls. The variables may be referenced as p1.selectedValue and p2.selectedValue. The query of panel 330 can reference p1.selectedValue and p2.selectedValue in the WHERE clause of a SELECT statement. For example, the query can be as follows: SELECT column FROM table WHERE team=p1.selectedValue AND season=p2.selectedValue. In the example of FIG. 3A, p1.selectedValue="Team 1" and p2.selectedValue="2014."

The query may refer to panels, variables of panels, and/or global variables as templates, and a template system or language can process the queries and replace any templates with corresponding values. For example, a template can be indicated by double curly brackets "{{" and "}}" in a template system or language, such as Handlebars and Mustache. In the example above, p1.selectedValue and p2.selectedValue may be enclosed in double curly brackets to indicate that they are templates. Therefore, the query for the example above can be written as: SELECT column FROM table WHERE team={{p1.selectedValue}} AND season={{p2.selectedValue}}. The template engine 350 can process and replace the templates with their corresponding values at the time of generating the finished user interface pages. In certain embodiments, the system 300 builds a graph of all the references from the templates and associates the references such that if any of the references change, the corresponding templates are regenerated or refreshed. Templates may also refer to objects other than panels, depending on the embodiment. Using double curly brackets to indicate templates is described above as an example, and any other syntax elements can be used to indicate templates.

In some embodiments, the user can define variables associated with the panels that can be referenced in a query. For example, the user can define variable A for panel 310 and variable B for panel 320, and the query for panel 330 can reference variable A and variable B in the query. For example, variable A and variable B can be associated with the selected value of panel 310 and panel 320, respectively. As explained above, in some embodiments, panels can have global variables associated with them.

Writing to Data Sources Using Dynamic Panels

Figure 4:
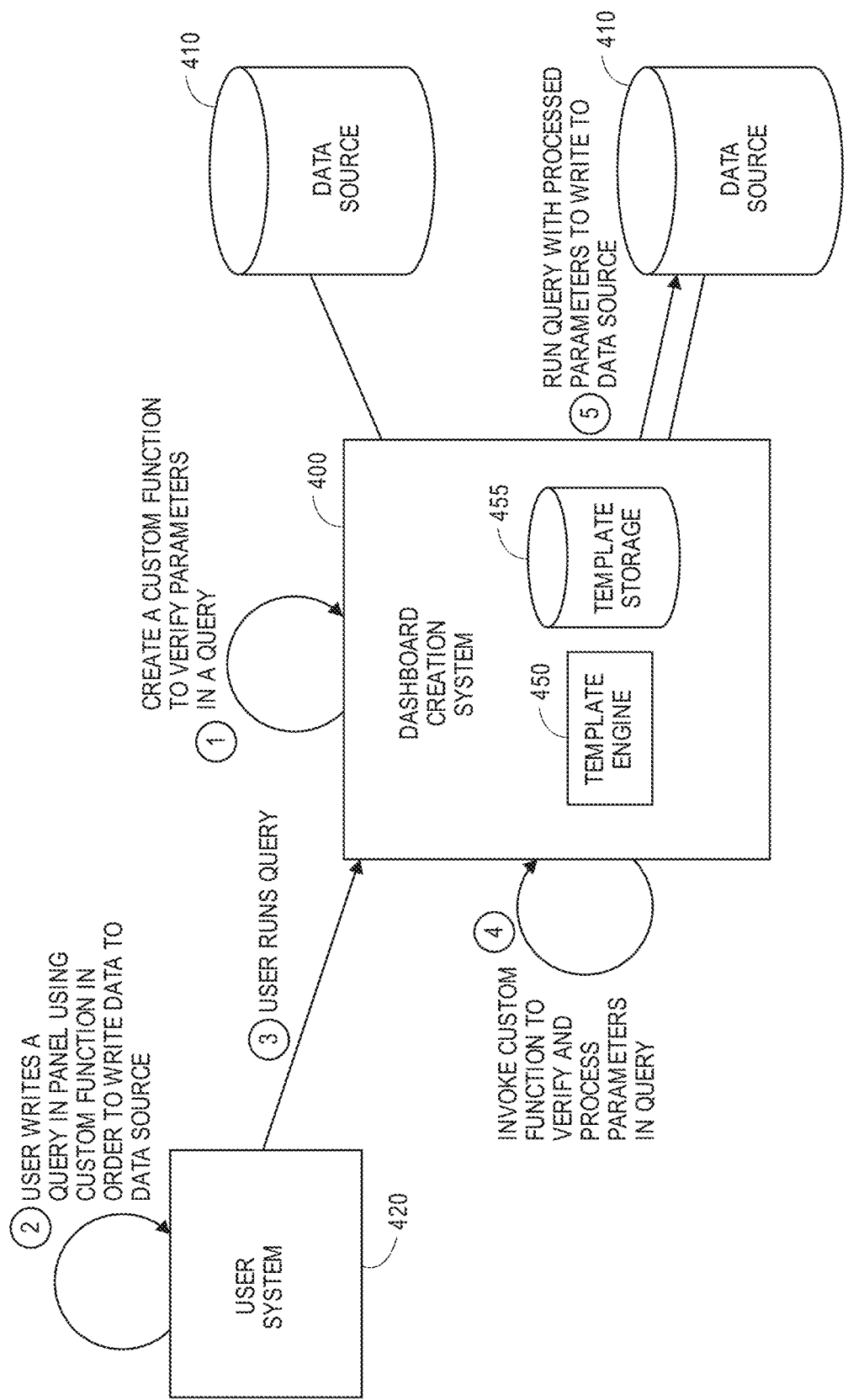
FIG. 4 is a data flow diagram illustrative of the interaction between the various components of a dashboard creation system configured to write to data sources using dynamic panels, according to one embodiment.

FIG. 4 is a data flow diagram illustrative of the interaction between the various components of a dashboard creation system 400 configured to write to data sources using dynamic panels, according to one embodiment. The system 400 and corresponding components of FIG. 4 may be similar to or the same as the system 300 and similarly named components of FIG. 3. The system 400 may include additional or different components, depending on the embodiment.

In some cases, it may be useful to allow users to write to or update the data sources through the panels. For example, the user may want to change the data in a panel and reflect the changes to the data source. The user could also save some selected rows from a table in one document for later use in other documents, or save notes from different users to a table for later reference. In certain cases, the user may also want to rename a portfolio in a database.

The system 400 can allow the users to update the data sources 410 through queries. For example, SQL queries or JSON queries can be used. SQL queries and JSON queries can refer to the panels as templates, and a template system or language like Handlebars or Mustache can process the queries and replace any templates with corresponding values. However, in certain cases, directly replacing the templates with the corresponding values can lead to unintended consequences. For instance, the user may specify an always true condition as the value to be replaced with a template in the WHERE clause of a SQL query, which can result in changing all data. In one example, the user creates a query as follows: UPDATE table SET text="newText" WHERE id={{p1.text}}. If the value of p1.text is "1=1," replacing the template {{p1.text}} with "1=1 would update every row in the table. Accordingly, the system 400 make the queries secure by using a custom function as explained below.

At data flow action 1, the system 400 creates a custom function to verify parameters in a query. For example, an administrator of the system 400 can create the custom function.

In some embodiments, the system 400 uses SQL queries and processes the SQL queries using Handlebars. The custom function can be a Handlebars helper. For example, the custom function can be named "param" and registered with Handlebars. Handlebars can invoke the custom function when processing the SQL queries. The user can use the custom function when using templates in SQL queries.

In one embodiment, the custom function prevents use of text values in templates and only allows parameter values in templates. For example, a variable of a panel used in a template should be a parameter value. Supposing that the variable of the panel referred to in a template is p1.property, the custom function checks whether p1.property is an array. If p1.property is not an array, the custom function replaces "{{param p1.property}}" with a "?" and saves the value of p1.property for reference, for example, in a reference array. If p1.property is an array with a length of n, the custom function replaces "{{param p1.property}}" with a string containing n question marks separated by commas and saves the value of each of element in the array for reference, for example, in a reference array. In this way, the custom function can help create parameterized queries, which contain placeholders such as "?" that can be inserted in query parameters. The SQL engine would escape and not evaluate these parameters, and therefore, parameterized queries can prevent SQL injection. For instance, the expression "1=1" would be escaped and would not be evaluated as a boolean expression; rather it is evaluated as a string.

For example, if p1.property is equal to 1, the custom function processes the SQL query UPDATE table SET text="newText" WHERE id={{param p1.property}} to UPDATE table SET text="newText" WHERE id=?, and stores 1 in the reference array. In another example, if p1.property is equal to an array [1, 2], the custom function processes the SQL query UPDATE table SET text="newText" WHERE id={{param p1.property}} to UPDATE table SET text="newText" WHERE id=(?, ?), and stores 1 and 2 in the reference array. The processed query and parameters can be prepared as a JDBC statement and run against one or more data sources 410. Types of parameters can be preserved (e.g., whether the parameter is a number or a string) by using additional Handlebars helpers.

In other embodiments, the system 400 uses JSON queries and processes the JSON queries using Handlebars and/or Mustache. A JSON query can include three parts: path, method, and body. The path and the body can use templates; since the method generally has a few options, templates may not be used with the method. In order to have different rules for the use of templates, the path, method, and body can be separated into different components of the query. For example, the path and method can be considered as metadata, and the body can be considered as the template.

The custom function can be used on the body of a JSON query. The custom function can be a Handlebars helper. For example, the custom function can be named "{{esc}}" and registered with Handlebars. Handlebars can invoke the custom function when processing JSON queries. The user can use the custom function when using templates in JSON queries. The custom function may verify that all values for templates are valid JSON values (e.g., string, number, object, array, boolean, null, etc.). The custom function can convert the value of templates to string format (e.g., using JSON stringify function). For example, {value: {{esc p1.value}}} where p1.value is "a" (chars [a]) is evaluated to be {value: "a"}.

The system 400 can also create an additional custom function for string interpolation or for cases where the user wants to use another Handlebars helper (e.g., the join helper). The additional custom function can be a block helper; for example, it can be referred to as {{#esc}}{{/esc}} block helper. In one embodiment, the block helper can evaluate the templates within the block helper, take the result as one string, and convert the one string to string format. In other embodiments, Handlebars evaluates what is inside the block helper, and the helpers within the block helper can convert the result to string format. In certain embodiments, the block helper or helpers convert the result to string format (e.g., by calling JSON stringify function) for security. In one embodiment, JSON stringify function can be called on block helpers for security. Various embodiments described in this disclosure may be implemented separately or in combination as appropriate.

The system 400 may also define rules and features to be implemented in association with the custom function(s). In one example, for the path, the system 400 can require that values for templates are uniform resource identifier (URI) unreserved characters and are not periods. This can prevent the template value from going outside of the intended space in the path (e.g., intended directory). In some embodiments, the system 400 may not allow quotes around templates to avoid a string object from being closed accidentally. The system 400 may also require that all other non-block helpers are nested inside the {{esc}} helper or used inside the {{#esc}}{{/esc}} block helper.

At data flow action 2, the user writes a query in a panel using the custom function in order to write data to a data source 410. The system 400 can require users to use the custom functions when writing queries to write to a data source 410. For instance, the system 400 can return errors for queries that do not use the custom functions or do not use the custom functions properly.

At data flow action 3, the user runs the query. The user can associate the query with a query button panel. The user may run the query by clicking on the query button. The user system 420 can send the user query to the system 400.

At data flow action 4, the system 400 invokes the custom function to verify and process the parameters in the query. Upon receiving the user query from the user system 420, the system 400 can invoke the custom function on the query and format the query appropriately. If the processed query does not conform to the rules associated with the custom function, the system 400 can return an error.

At data flow action 5, the system 400 runs the query with the processed parameters to write to the data source 410. If the processed query is properly written and/or conforms to the rules associated with the custom function, the system 400 runs the query against the data source 410.

In certain embodiments, the system 400 also implements custom functions to verify parameters of queries for reading data. For example, the system 400 can create custom functions (e.g., Handlebars helpers) for verifying table names, column names, alias table names, alias column names, etc. In one embodiment, the system 400 creates Handlebars helpers "table," "column," and "alias" to make sure the table, column, or alias actually exists in the data sources 410. The system 400 can verify a table name or column name by checking that the table name or column name is within the schema of the database. The user can register the alias table name or column name, and the system 400 may verify an alias name by checking that it is registered.

Figure 5:
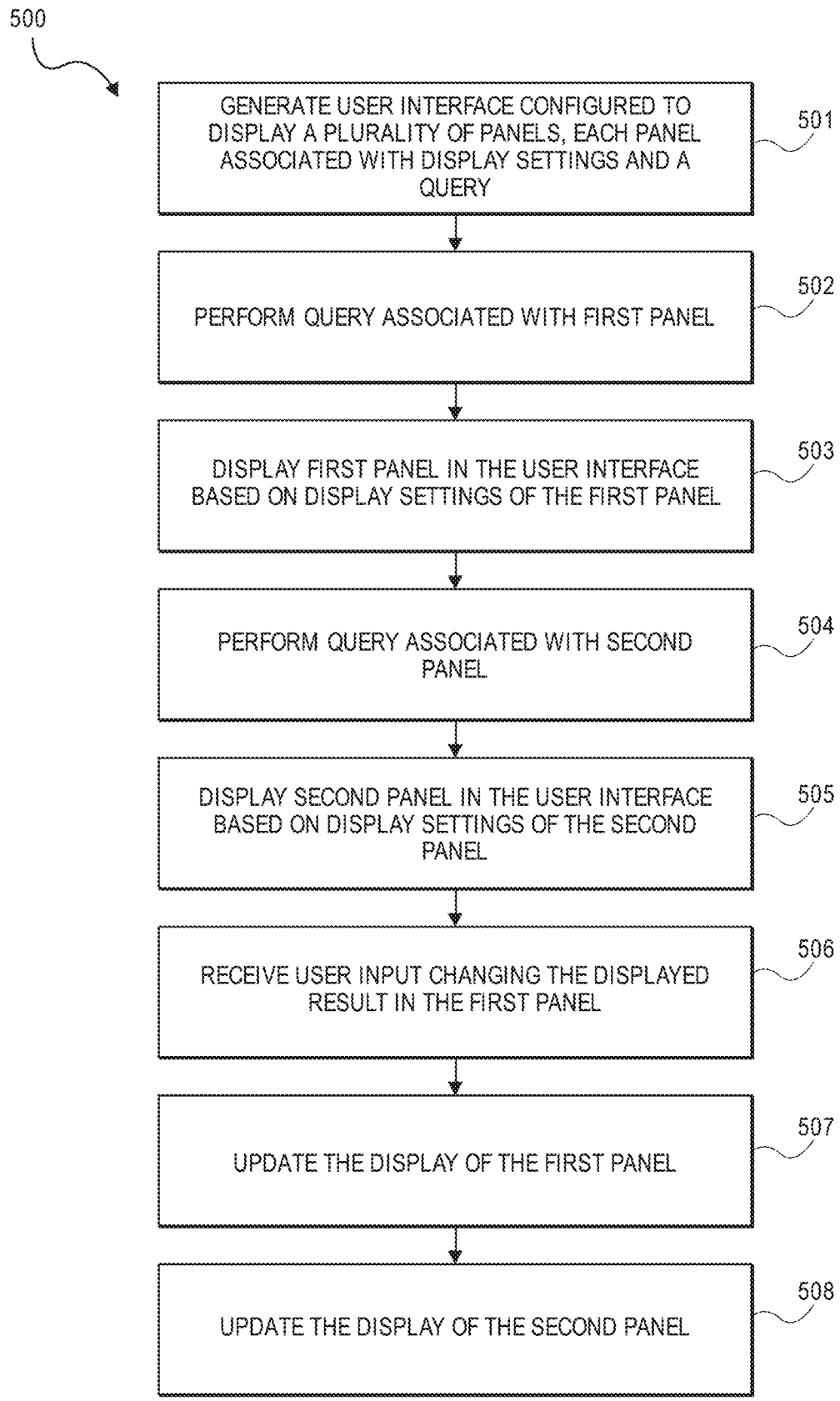
FIG. 5 illustrates a flowchart for creating and displaying dynamic panels in a user interface, according to certain embodiments.

FIG. 5 illustrates a flowchart for creating and displaying dynamic panels in a user interface, according to certain embodiments. The process 500 may be implemented by one or more systems described with respect to FIGS. 3 and 4. For illustrative purposes, the process 500 is explained below in connection with the system 300 in FIG. 3 and the example of FIG. 3A. Certain details relating to the process 500 are explained in more detail with respect to FIGS. 1-4. Depending on the embodiment, the process 500 may include fewer or additional blocks, and the blocks may be performed in an order that is different than illustrated.

At block 501, the system 300 generates a user interface configured to display a plurality of panels, each panel associated with display settings and a query. At block 502, the system 300 performs the query associated with a first panel. The first panel can be panel 310 in FIG. 3A.

At block 503, the system 300 displays the first panel in the user interface based on the display settings of the first panel. The query of panel 310 can be run to obtain the list of teams to display in panel 310. The list of teams can be displayed according the document CSS of panel 310. One team from the list of teams may be displayed in panel 310 as the default value. For example, panel 310 shows the first team in the list.

Similarly, the system 300 can perform the query associated with panel 320 and display panel 320 in the user interface based on the display settings of panel 320. One season from the list of seasons may be displayed in panel 320 as the default value. For example, panel 320 shows the most current season in the list.

At block 504, the system 300 performs the query associated with a second panel. The second panel can be panel 330 in FIG. 3A.

At block 505, the system 300 displays the second panel in the user interface based on the display settings of the second panel. The query of panel 330 can be run to obtain the list of games to display in panel 330. As explained above, the query of panel 330 obtains the list of games to display for the team selected in panel 310 and the season selected in panel 320. The list of games can be displayed according the document CSS of panel 330.

At block 506, the system 300 receives user input changing the displayed result in the first panel. For example, the user selects Team 1 from the list of teams in panel 310, and panel 310 is updated to show Team 1 as selected. The user selection is sent to the system 300.

At block 507, the system 300 updates the display of the first panel. If there are any changes to be made to panel 310, the system 300 can refresh panel 310, e.g., by rerunning the query and/or regenerating panel 310 through the template engine 350. In the example of FIG. 3A, panel 310 is a dropdown control, so the system 300 may not have to update panel 310.

At block 508, the system 300 updates the display of the second panel. Since the query of panel 330 links to panel 310, panel 330 is also updated to display games for Team 1 for the season selected in panel 320. For example, the query for panel 330 can be rerun. In this manner, linked panels can be updated dynamically.

Figure 6:
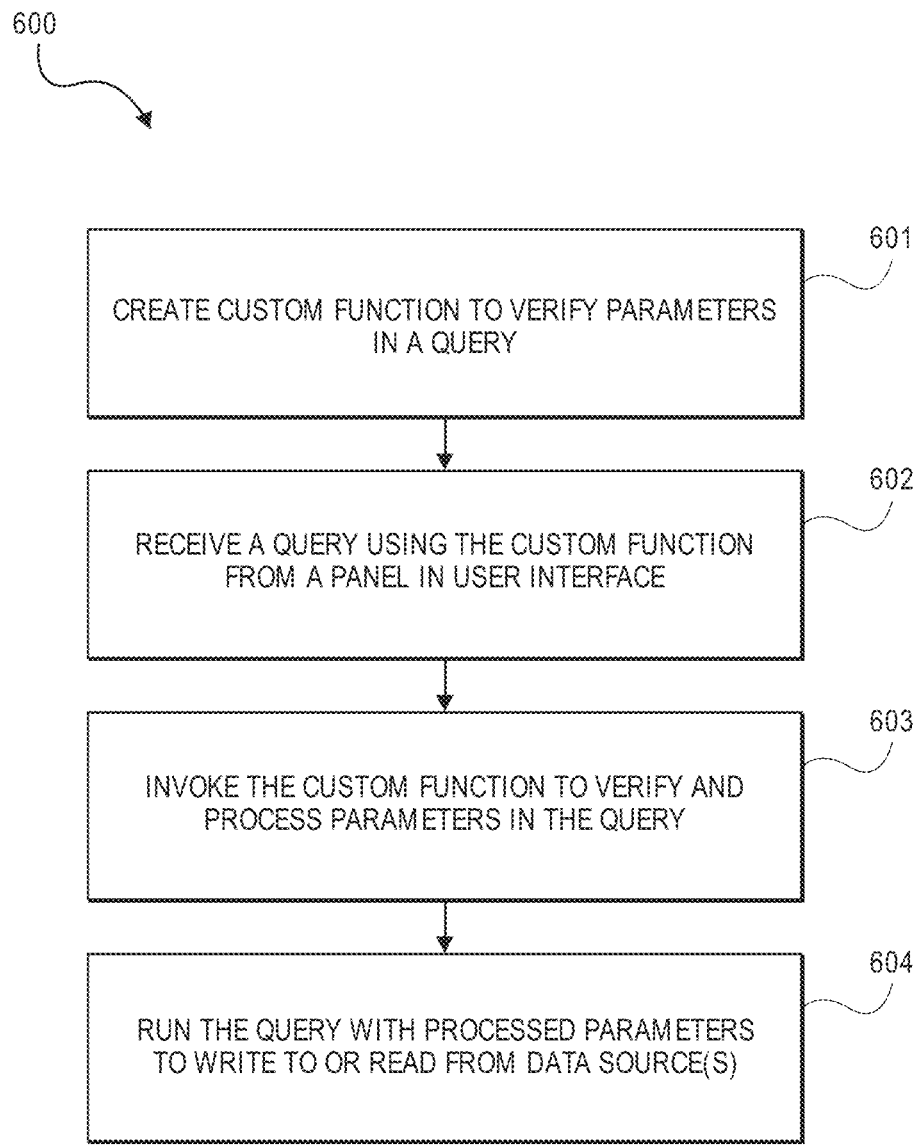
FIG. 6 illustrates a flowchart for writing to data sources using dynamic panels, according to certain embodiments.

FIG. 6 illustrates a flowchart for writing to data sources using dynamic panels, according to certain embodiments. The process 600 may be implemented by one or more systems described with respect to FIGS. 3 and 4. For illustrative purposes, the process 600 is explained below in connection with the system 400 in FIG. 4. Certain details relating to the process 600 are explained in more detail with respect to FIGS. 1-5. Depending on the embodiment, the process 600 may include fewer or additional blocks, and the blocks may be performed in an order that is different than illustrated.

At block 601, the system 400 creates a custom function to verify parameters in a query. The custom functions may be Handlebars helpers explained above, such as param helper, {{esc}} helper, {{#esc}}{{/esc}} block helper, etc.

At block 602, the system 400 receives a query using the custom function from a panel in the user interface. The user writes a query that uses the custom function.

At block 603, the system 400 invokes the custom function to verify and process parameters in the query. In one embodiment, the custom function replaces the parameters with respective placeholders and stores respective values corresponding to the parameters in an array. In another embodiment, the custom function changes respective values corresponding to the parameters to string format.

At block 604, the system 400 runs the query with the processed parameters to write to or read from the data source(s) 410.

FIGS. 7A-7C illustrate various examples of panels and features provided by a dashboard creation system, according to certain embodiments. FIG. 7A illustrates the alignment indicator feature for panels. As the user moves a panel within the user interface, other panels that line up with the panel being moved can be distinguished in the user interface to indicate that they are aligned. For example, the borders of the other panels can be highlighted, displayed in a different color, etc. In one embodiment, one or more guidelines appear to show that the panels are lined up (e.g., at one edge).

FIG. 7B illustrates the auto zoom feature for panels. When the finished user interface pages are displayed in the user interface, the user may resize the window of the user interface. In such case, the document and/or the panels in the user interface pages may be resized based on the width of the window. For example, if the window size is increased, the size of the document and/or the panels in the UI pages increase to fit the width of the window. Or if the window size is decreased, the size of the document and/or the panels in the UI pages decrease to fit the width of the window. This can be different from typical web pages where the content of the web pages remains the same regardless of whether the window of the browser is resized or not.

FIG. 7C illustrates another example of a panel 730. This panel may be referred to as a "card" panel since it includes one or more cards that can be selected. A card panel may refer to visualization of certain information within a card-like display. Either a single card or multiple cards can be selected, and the selections can be linked to other panels. In the example of FIG. 7C, different cards indicate a particular score combination for the outcome of a game. Users may sign up for a particular score combination in order to predict the outcome, and the user names are listed in the card they sign up for.

In certain embodiments, the user login information may be saved as global variables so that they can be accessible within the document. The user login information can include the group, email address, name, etc. of the user. The user login information may be used in queries, for example, to check permissions, etc.

Dashboard Creation Application

The system for providing a plurality of dynamic panels in a user interface as explained above may also be referred to as a "Dashboard Creation Application." The Dashboard Creation Application (DCA) can be an extensible WYSIWYG (What You See Is What You Get) web application for quickly and easily creating interactive, data-driven web pages. For example, the Dashboard Creation Application can easily create interactive dashboards which support light-weight filtering and drill-down operations on top of arbitrary data storage systems or data sources.

In one embodiment, the Dashboard Creation Application enables analysts to author dashboards of visualizations for easy consumption by end users. It will provide a number of panels like charts, tables, and images, in a pluggable architecture so analysts can add custom panels for particular deployments. For example, a standard plug-in structure can be used across systems and products. Panels will be interactive and coordinated, and support filtering/aggregations to create drill-down style analysis. The dashboard author will have fine control over the layout and styling of the panels contained in each Dashboard Creation Application dashboard. The Dashboard Creation Application will be deployable on top of any collection of other products for presentation and dashboarding use cases because it is agnostic to the underlying data store.

In various embodiments, the Dashboard Creation Application may perform one or more of the functions noted below:
  Create dashboards which use Elasticsearch or SQL data sources
  Add chart, table, text, dropdown, map, multi-select, etc. panels to dashboards
  Create custom panels
  Create basic links between panels
  Move and resize panels via the UI
  Edit the query template associated with a panel through the UI
  Create/manage new documents through the UI
  Flexibility around which portions of a JSON response can be accessed and used as data for the panels
  Share a pool of queries/variables across all panels to make it easier to build dashboards
  Abstracting out features across backends into the "basic" or "beginner" UI In some embodiments, the Dashboard Creation Application integrates closely with other products so that more use cases can be covered by combining the tools appropriately. The numbers and types of users reached can be increased by improving the usability and expressiveness of the UI available to end users for building dashboards. In various embodiments, the Dashboard Creation Application may implement one or more of the functions noted below:

Expansion of the formatting UI—users can make very specific visual edits to the panels through the UI Filters and/or panels from other applications or web-based applications can be dropped into and used inside Dashboard Creation Application.

Implementation Mechanisms

According to one embodiment, the techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

For example, FIG. 8 shows a block diagram that illustrates a computer system 800 upon which an embodiment may be implemented. For example, the computing system 800 may comprise a system for providing a plurality of dynamic panels in a user interface. Other computing systems discussed herein may include any portion of the circuitry and/or functionality discussed with reference to system 800. For instance, the system 300 and/or 400 can each include some or all of the components and/or functionality of the system 800.

Computer system 800 includes a bus 802 or other communication mechanism for communicating information, and a hardware processor, or multiple processors, 804 coupled with bus 802 for processing information. Hardware processor(s) 804 may be, for example, one or more general purpose microprocessors.

Computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

Computer system 800 may be coupled via bus 802 to a display 812, such as a cathode ray tube (CRT) or LCD display (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between nontransitory media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicate with a WAN). Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 825. Local network 822 and Internet 825 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 825, ISP 826, local network 822 and communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer system comprising:
one or more hardware computer processors configured to execute instructions to cause the computer system to:
provide a first user interface configured to display a first panel associated with a query, wherein the query comprises a first section of code written in a first programming language and a second section of code written in a template syntax, and wherein the second section of code comprises a function call;
receive a first user interaction with the first panel initiating execution of the query; and
in response to receiving the first user interaction:
process a parameter of the query according to the function call to change the second section of code, wherein changing the second section of code includes replacing the parameter of the query with a placeholder; and
execute the query, including the changed second section of code, to write data to, or update data in, a data source based at least in part on the first user interaction.

2. The computer system of claim 1, wherein processing the parameter according to the function call further comprises:
storing a value corresponding to the replaced parameter in an array.

3. The computer system of claim 2, wherein processing the parameter according to the function call further comprises:
replacing a coding of the second section of code with different code.

4. The computer system of claim 3, wherein processing the parameter according to the function call further comprises:
preserving a type of data.

5. The computer system of claim 1, wherein processing the parameter according to the function call comprises:
changing a value of the parameter of the query to a string format.

6. The computer system of claim 1, wherein the template syntax comprises at least one of: Handlebars, Mustache, or a semantic template language.

7. The computer system of claim 1, wherein:
the first panel is referenced as a template that is rendered by a template engine, and
the function call is registered with the template engine.

8. The computer system of claim 1, wherein the one or more hardware computer processors are configured to execute instructions to further cause the computer system to:
provide a second user interface configured to display and enable editing of a coding of the query that comprises the first and second sections of code.

9. A computer-implemented method comprising:
by one or more hardware computer processors executing instructions:
providing a first user interface configured to display a first panel associated with a query, wherein the query comprises a first section of code written in a first programming language and a second section of code written in a template syntax, and wherein the second section of code comprises a function call;
receiving a first user interaction with the first panel initiating execution of the query; and
in response to receiving the first user interaction:
processing a parameter of the query according to the function call to change the second section of code, wherein changing the second section of code includes replacing the parameter of the query with a placeholder; and
executing the query, including the changed second section of code, to write data to, or update data in, a data source based at least in part on the first user interaction.

10. The computer-implemented method of claim 9, wherein processing the parameter according to the function call further comprises:
storing a value corresponding to the replaced parameter in an array.

11. The computer-implemented method of claim 10, wherein processing the parameter according to the function call further comprises:
replacing a coding of the second section of code with different code.

12. The computer-implemented method of claim 11, wherein processing the parameter according to the function call further comprises:
preserving a type of data.

13. The computer-implemented method of claim 9, wherein processing the parameter according to the function call comprises:
changing a value of the parameter of the query to a string format.

14. The computer-implemented method of claim 9, wherein the template syntax comprises at least one of: Handlebars, Mustache, or a semantic template language.

15. The computer-implemented method of claim 9, wherein:
the first panel is referenced as a template that is rendered by a template engine, and
the function call is registered with the template engine.

16. The computer-implemented method of claim 9 further comprising:
   by the one or more hardware computer processors executing instructions:
      providing a second user interface configured to display and enable editing of a coding of the query that comprises the first and second sections of code.

\* \* \* \* \*